(12) United States Patent
Adachi et al.

(10) Patent No.: US 9,338,859 B2
(45) Date of Patent: May 10, 2016

(54) ILLUMINATED MAKEUP MIRROR SET AND METHOD OF CONTROLLING LIGHT SOURCE

(75) Inventors: Kazufumi Adachi, Kawasaki (JP);
Kazunaga Ida, Kawasaki (JP); Taku Ito, Kawasaki (JP); Harumi Nakamura, Kawasaki (JP); Meiji Kitamura, Kawasaki (JP); Takeshi Nakamura, Kawasaki (JP); Yosuke Sato, Yonezawa (JP); Takuo Shinohara, Kawasaki (JP)

(73) Assignees: PIONEER CORPORATION, Kawasaki-Shi, Kanagawa (JP);
TOHOKU PIONEER CORPORATION, Tendo-Shi, Yamagata (JP)

( * ) Notice: Subject to any disclaimer, the term of this patent is extended or adjusted under 35 U.S.C. 154(b) by 228 days.

(21) Appl. No.: 14/348,210

(22) PCT Filed: Sep. 30, 2011

(86) PCT No.: PCT/JP2011/072583
§ 371 (c)(1),
(2), (4) Date: Jun. 19, 2014

(87) PCT Pub. No.: WO2013/046438
PCT Pub. Date: Apr. 4, 2013

(65) Prior Publication Data
US 2014/0368112 A1 Dec. 18, 2014

(51) Int. Cl.
*H05B 37/02* (2006.01)
*A47G 1/02* (2006.01)
*H05B 33/08* (2006.01)
*A47G 1/00* (2006.01)
*F21V 33/00* (2006.01)
*G01J 1/42* (2006.01)
*G01J 3/50* (2006.01)

(52) U.S. Cl.
CPC .............. *H05B 37/0218* (2013.01); *A47G 1/00* (2013.01); *A47G 1/02* (2013.01); *F21V 33/004* (2013.01);
(Continued)

(58) Field of Classification Search
CPC ........... H05B 33/0815; H05B 37/0218; H05B 37/0272; H05B 37/029; H05B 33/086; H05B 37/0245; A45D 42/10; A47G 1/02; A47G 2200/08; A47G 2200/085; G01J 1/4204; G01J 3/505
USPC ........... 315/307, 312, 149; 362/135, 140–142
See application file for complete search history.

(56) References Cited

U.S. PATENT DOCUMENTS 8,384,541 B2 * 2/2013 Lee ..................... H01M 10/465
                                                    320/101
8,552,659 B2 10/2013 Ashdown et al.
(Continued)

FOREIGN PATENT DOCUMENTS

JP          64-27058 B      2/1989
JP          04-129195 A1    4/1992
(Continued)

OTHER PUBLICATIONS

International Search Report and Written Opinion dated Dec. 20, 2011, issued for International Application No. PCT/JP2011/072583.
(Continued)

*Primary Examiner* — Haissa Philogene
(74) *Attorney, Agent, or Firm* — Procopio, Cory, Hargreaves & Savitch LLP

(57) ABSTRACT

An illuminated makeup mirror set includes: a mirror unit; a surface light source for illumination with adjustable color and adjustable brightness; a memory unit in which illumination conditions corresponding to a plurality of scenes are stored; a detection unit for detecting the color and brightness of ambient light at an installation position of the makeup mirror set; a selection unit for selecting one of the plurality of scenes according to an input operation; an acquisition unit for acquiring, from the memory unit, illumination conditions corresponding to the scene selected through the selection unit; and an adjustment unit for adjusting the color and brightness of the surface light source according to the color and brightness of the ambient light detected by the detection unit and the illumination conditions acquired by the acquisition unit.

13 Claims, 9 Drawing Sheets

(52) U.S. Cl.
CPC .............. *G01J 1/4204* (2013.01); *G01J 3/505* (2013.01); *H05B 33/086* (2013.01); *A47G 2200/08* (2013.01)

(56) References Cited

U.S. PATENT DOCUMENTS

| | | | | |
|---|---|---|---|---|
| 8,767,030 | B2* | 7/2014 | Singhal | ................ H04N 5/2256 348/14.01 |
| 2011/0309754 | A1 | 12/2011 | Ashdown et al. | |
| 2013/0027913 | A1* | 1/2013 | Frisch | .................... A45D 42/10 362/141 |
| 2014/0240964 | A1* | 8/2014 | Adachi | .................. A45D 42/04 362/141 |
| 2015/0159856 | A1* | 6/2015 | Adachi | .................... A47G 1/02 362/141 |

FOREIGN PATENT DOCUMENTS

| | | |
|---|---|---|
| JP | 05-174977 A1 | 7/1993 |
| JP | 2001-286373 A1 | 10/2001 |
| JP | 2008-018058 A1 | 1/2008 |
| JP | 2009-125114 A1 | 6/2009 |
| JP | 2010-536139 A1 | 11/2010 |
| WO | WO2009019655 A1 | 2/2009 |

OTHER PUBLICATIONS

International Preliminary Report on Patentability dated Aug. 14, 2012, issued for International Application No. PCT/JP2011/072583.

PCT Demand under Article 31 dated May 25, 2012, issued for International Application No. PCT/JP2011/072583.

* cited by examiner

ILLUMINATED MAKEUP MIRROR SET AND METHOD OF CONTROLLING LIGHT SOURCE

TECHNICAL FIELD

The present invention relates to an illuminated makeup mirror set including a mirror unit and a light source for illumination and to a method of controlling the light source.

BACKGROUND ART

When makeup (including hair styling) is put on a model or actress, illumination is necessary to clearly reflect the process of the makeup in a mirror. One known illumination light fixture is a so-called Hollywood light fixture including a plurality of light sources arranged in a row. An illuminated makeup mirror set including a makeup mirror and Hollywood light fixtures disposed on opposite sides of the makeup mirror has been commercially available as a makeup case. In these Hollywood light fixtures, the light sources used are generally incandescent lamps, which are point light sources.

In addition, an illuminated makeup mirror set including a makeup mirror and a lighting fixture with variable illumination characteristics is known (Patent Document 1). In the illuminated makeup mirror set in Patent Document 1, data of the illumination characteristics of illumination light for a scene selected by the user is acquired from a possible scene illumination database pre-stored in a memory unit. Then a control signal for illumination with the acquired illumination characteristics is supplied to the lighting fixture, and the lighting fixture provides illumination according to the control signal.

CITATION LIST

Patent Documents

Patent Document 1: Japanese Patent Application Laid-Open No. 2009-125114

SUMMARY OF THE INVENTION

Problem to be Solved by the Invention

In the conventional illuminated makeup mirror set, the illumination characteristics of illumination light are changed according to a pre-assumed scene to produce the conditions for applying makeup. However, since the presence of surrounding ambient light is not taken into consideration, the optimal illumination conditions for the situation are not always obtained. Particularly, since the ambient light changes according to time and the installation position of the illuminated makeup mirror set, the influence of the ambient light cannot be ignored.

One example of problems to be solved by the present invention is the above-described drawback, and it is an object of the present invention to provide an illuminated makeup mirror set capable of producing illumination conditions optimal for a scene in consideration of the influence of ambient light and to provide a method of controlling a light source.

Means to Solve the Problem

An illuminated makeup mirror set in an invention according to claim 1 comprises: a surface light source for illumination with adjustable color and adjustable brightness; a memory unit in which illumination conditions corresponding to a plurality of scenes are stored; a detection unit for detecting color and brightness of ambient light at an installation position of the makeup mirror set; a selection unit for selecting one of the plurality of scenes according to an input operation; an acquisition unit for acquiring, from the memory unit, the illumination conditions corresponding to the scene selected through the selection unit; and an adjustment unit for adjusting the color and brightness of the surface light source according to the color and brightness of the ambient light detected by the detection unit and the illumination conditions acquired by the acquisition unit.

A method of controlling a light source in an illuminated makeup mirror set in an invention according to claim 6 is a light-source controlling method for a makeup mirror set including a mirror and a surface light source for illumination with adjustable color and adjustable brightness, the method comprising: a detection step of detecting color and brightness of ambient light at an installation position of the makeup mirror set; a selection step of selecting one scene from the plurality of scenes according to an input operation; an acquisition step of acquiring, from illumination conditions corresponding to a plurality of scenes and stored in the memory unit, the illumination conditions corresponding the scene selected through the selection unit; and an adjustment step of adjusting the color and brightness of the surface light source according to the color and brightness of the ambient light detected in the detection step and the illumination conditions acquired in the acquisition step.

DESCRIPTION OF EMBODIMENTS

In the illuminated makeup mirror set and the light-source controlling method for an illuminated makeup mirror set, one scene is selected from a plurality of scenes according to an input operation, and the color and brightness of ambient light at the installation position of the makeup mirror set are detected. The color and brightness of the surface light source are adjusted according to the detected color and brightness of the ambient light and the illumination conditions corresponding to the selected scene and acquired from the memory unit. Therefore, illumination conditions optimal for the selected scene can be produced in consideration of the influence of ambient light.

EMBODIMENTS

Embodiments of the present invention will next be described in detail with reference to the drawings.

Figure 1:
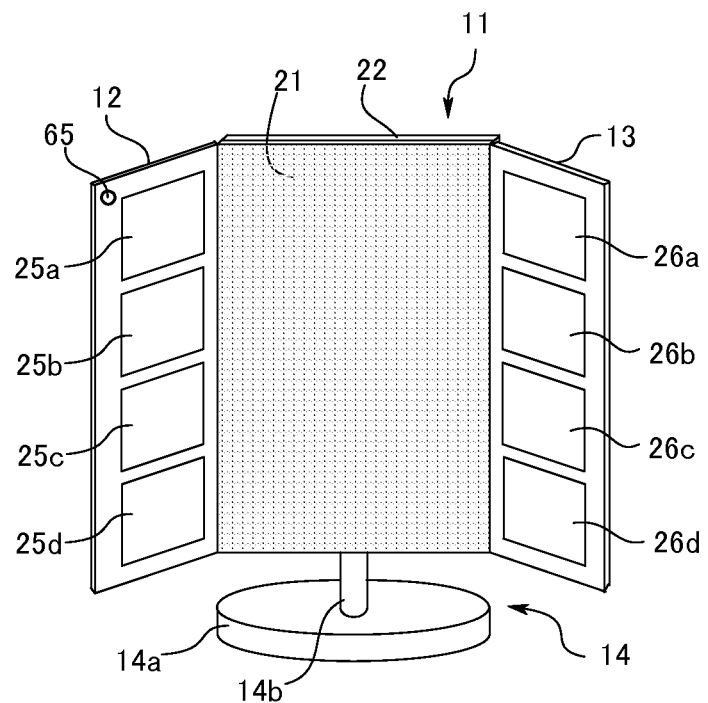
FIG. 1 is an external view of an illuminated makeup mirror set in an embodiment of the present invention.
Figure 2:
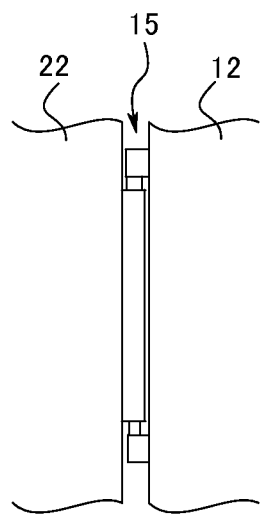
FIG. 2 is a diagram illustrating a hinge mechanism in the makeup mirror set in FIG. 1.

FIG. 1 shows an illuminated makeup mirror set. This makeup mirror set includes a mirror unit 11, left and right side plates 12 and 13, and a support 14. The mirror unit 11 includes a rectangular mirror 21 and a flat plate 22 affixed to the rear face of the mirror 21. The flat plate 22 is formed from a resin, wood, or a metal and may have the same size as the mirror 21 or may be slightly larger than the mirror 21. The left side plate 12 is connected to the left edge of the mirror unit 11 such that the angle therebetween is freely adjustable, and the right side plate 13 is connected to the right edge of the mirror unit 11 such that the angle therebetween is freely adjustable. A hinge mechanism 15 is formed between the mirror unit 11 and each of the side plates 12 and 13, as shown in FIG. 2, and the hinge mechanisms 15 allow the above connection angles to be freely adjustable. Each of these angles can be adjusted within the range of from an angle at which the mirror unit 11 and one of the side plates 12 and 13 are substantially flush with each other to an angle at which the one of the side plates 12 and 13 is folded with respect to the mirror unit 11.

The vertical length of each of the side plates 12 and 13 is the same as the vertical length of the mirror unit 11, but the horizontal length of each of the side plates 12 and 13 is equal to or less than ½ of the horizontal length of the mirror unit 11.

Four organic EL (Electro Luminescence) panels (surface light sources) 25a to 25d and four organic EL panels 26a to 26d are vertically arranged on and attached to the surfaces of the side plates 12 and 13, respectively. The organic EL panels 25a to 25d and 26a to 26d are identical and have a square shape of, for example, 13 cm×13 cm.

The support 14 includes an elliptical flat base 14a and a strut 14b, and the strut 14b is vertically connected to the base 14a. The strut 14b of the support 14 is detachably connected to the mirror unit 11 to support the mirror unit 11 including the side plates 12 and 13. For example, a connection hole (not shown) is formed in a lower portion of the mirror unit 11. The top portion of the strut 14b is inserted into the connection hole, and the support 14 is thereby connected to the mirror unit 11.

In the makeup mirror set in FIG. 1 having the above-described configuration, the user such as a makeup artist operates each of the side plates 12 and 13 with their joints to the mirror unit 11 (the hinge mechanisms 15) serving as rotation axes to thereby adjust the angles between the mirror unit 11 and each of the side plates 12 and 13. More specifically, the angles between the mirror unit 11 and each of the side plates 12 and 13 can be adjusted such that an image of a makeup subject such as a model that is reflected in the mirror surface of the mirror 21 is preferably illuminated with light emitted from the organic EL panels 25a to 25d and 26a to 26d on the side plates 12 and 13.

Figure 3:
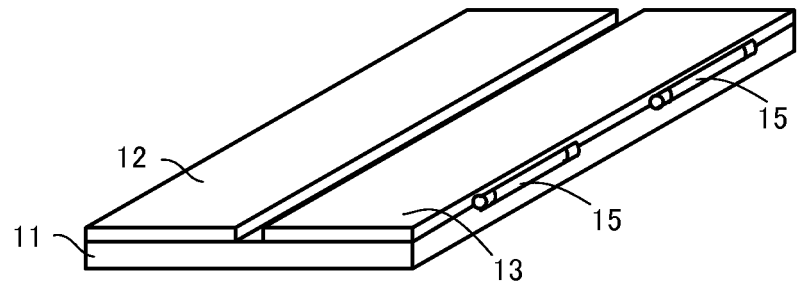
FIG. 3 is an external view of the makeup mirror set in FIG. 1 in a folded state.

The side plates 12 and 13 can respectively be folded as shown in FIG. 3 with the organic EL panels 25a to 25d and 26a to 26d disposed thereon. In the folded state, the side plates 12 and 13 are not in contact with each other. Since the thickness of the organic EL panels 25a to 25d and 26a to 26d is small, the organic EL panels 25a to 25d and 26a to 26d do not come into pressure contact with the mirror 21.

The support 14 can be detached from the mirror unit 11 to separate the support 14 from the mirror unit 11 and the side plates 12 and 13. Then the side plates 12 and 13 can be folded with respect to the mirror unit 11 as described above, whereby the makeup mirror set can be easily conveyed.

Next, a description will be given of the organic EL panels 25a to 25d and 26a to 26d in the makeup mirror set in FIG. 1 and their driving system.

Figure 4:
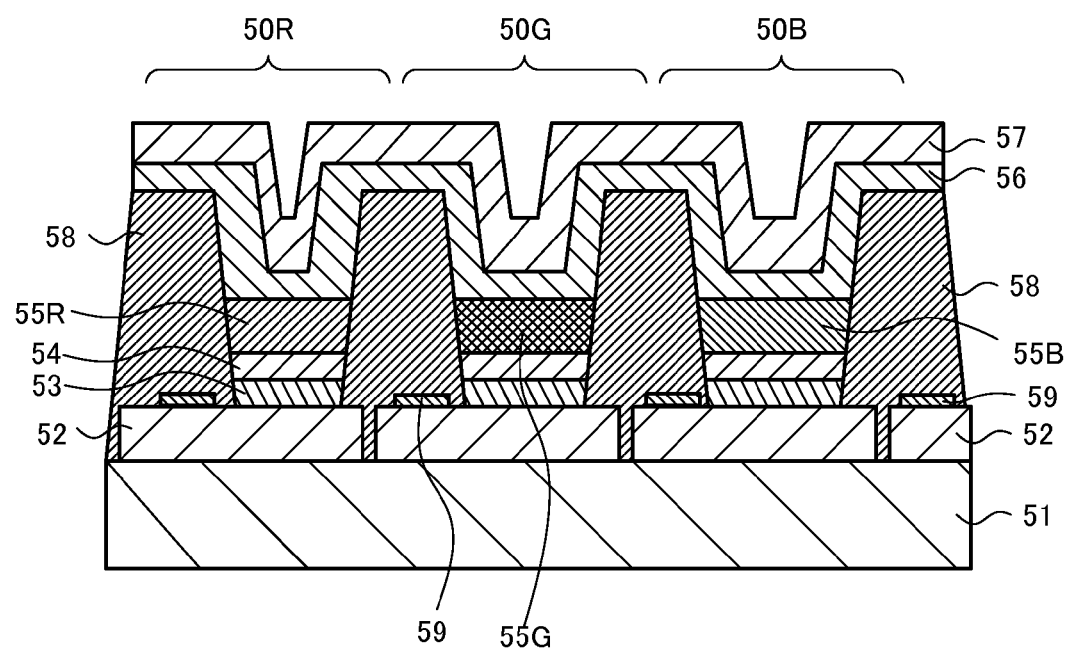
FIG. 4 is a cross-sectional view illustrating the structure of an organic EL panel in the makeup mirror set in FIG. 1.

Each of the organic EL panels 25a to 25d and 26a to 26d is a full-color illumination light-emitting panel, and stripe-shaped organic EL elements 50R, 50G, and 50B with emission colors of R (red), G (green), and B (blue) are formed on a glass substrate 51, as shown in FIG. 4. In FIG. 4, a cross section in a direction orthogonal to the straight stripes is shown.

Each of the organic EL elements 50R, 50G, and 50B has a structure in which an anode 52, a hole injection layer 53, a hole transport layer 54, an RGB light-emitting layer 55R, 55G, or 55B, an electron transport layer 56, and a cathode 57 are stacked in that order. The organic EL elements 50R, 50G, and 50B are partitioned by banks 58. Bus lines 59 are formed on the anodes 52 of the respective organic EL elements 50R, 50G, and 50B, and the anodes 52 are energized through the bus lines 59. Each anode 52 is formed of, for example, an ITO film formed by sputtering and having a thickness of 70 nm. Each hole injection layer 53 is formed of CuPc and has a thickness of 20 nm. Each hole transport layer 54 is formed of NPB and has a thickness of 20 nm. Each R (red) light-emitting layer 55R is formed of CPB as a host material and Ir(phq)$_2$tpy as a dopant. Each G (green) light-emitting layer 55G is formed of CPB as a host material and Ir(ppy)$_3$ as a dopant, and each B (blue) light-emitting layer 55B is formed of PAND as a host material and DPAVBi as a dopant. The thicknesses of the RGB light-emitting layers 55R, 55G, and 55B are 40 nm. Each electron transport layer 56 is formed of CsxMoOx-doped NBphen and has a thickness of 30 nm. Each cathode 57 is formed of an Al film having a thickness of 70 to 100 nm. The internal structure of each of the organic EL panels 25a to 25d and 26a to 26d is only an example, and the present invention is not limited thereto.

Figure 5:
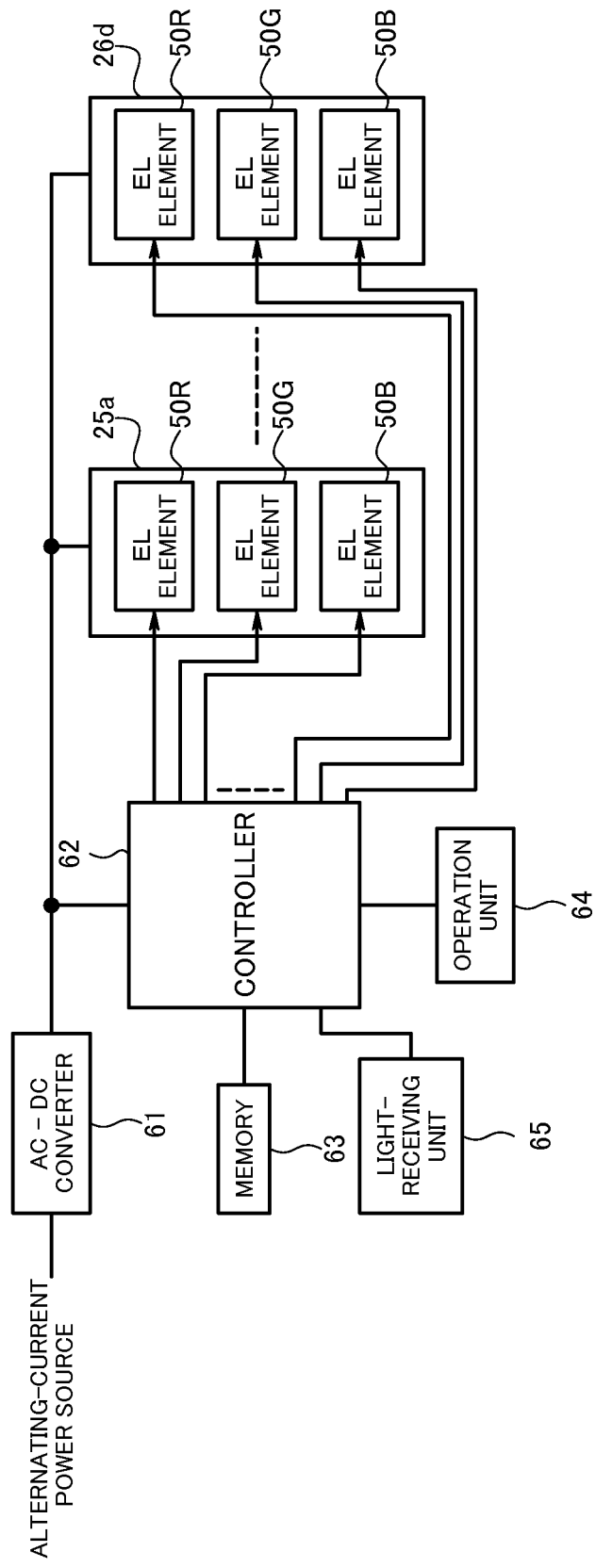
FIG. 5 is a block diagram showing the configuration of a driving unit in the makeup mirror set in FIG. 1.

The makeup mirror set in FIG. 1 further includes a driving unit for driving the organic EL panels 25a to 25d and 26a to 26d. As shown in FIG. 5, the driving unit includes an AC-DC converter 61, a controller 62, a memory 63, an operation unit 64, and a light-receiving unit 65. The AC-DC converter 61 converts alternating voltage to direct voltage and outputs the direct voltage. The output voltage from the AC-DC converter 61 is supplied as direct current power to the organic EL panels 25a to 25d and 26a to 26d and the controller 62. The controller 62 is operated by the output voltage from the AC-DC convertor 61 as a power source and includes, for example, a CPU. The controller 62 controls the driving current for each of the RGB organic EL elements 50R, 50G, and 50B in the respective organic EL panels 25a to 25d and 26a to 26d to thereby control light emission (emission color and brightness) of each of the organic EL panels independently.

The memory 63, the operation unit 64, and the light-receiving unit 65 are further connected to the controller 62. Programs and data necessary for the control by the controller 62 are stored in the memory 63. The operation unit 64 is provided as a wired or wireless remote controller.

Figure 6:
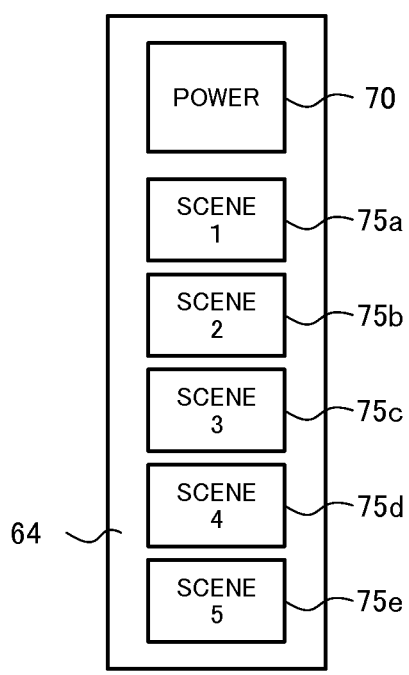
FIG. 6 is a diagram illustrating respective push buttons in an operation unit in the makeup mirror set in FIG. 1.

The operation unit 64 includes a power button 70 and scene buttons 75a to 75e, as shown in FIG. 6. After the user operates the power button 70 in the operation unit 64 to turn the power on, the operation unit 64 serves as a selection unit in which one of the scene buttons 75a to 75e can be operated.

Illumination conditions, including color and brightness (luminosity), for a plurality of scenes are pre-stored as date in the memory 63 (a storage unit). Examples of the scenes include an office, a hotel lounge, a dinner party, a fashion show, and an outdoor location. RGB driving voltage values corresponding to optimal emission color and brightness for each of the organic EL panels 25a to 25d and 26a to 26d are stored as data in the memory 63. The number of the scene buttons 75a to 75e provided is the same as the number of the plurality of scenes stored as data in the memory 63.

The light-receiving unit 65 and the controller 62 form a detection unit for detecting the color and brightness of ambient light at the installation position of the makeup mirror set. The light-receiving unit 65 is attached to, for example, one of the mirror unit 11 and the side plates 12 and 13 (the light-receiving unit 65 is attached to the side plate 12 in FIG. 1) and detects, as ambient light, a video image (e.g., a white screen image) in the place (a room) in which the makeup mirror set is installed. The light-receiving unit 65 is, for example, a color camera and outputs an RGB video signal representing the ambient light. The video signal of the ambient light detected by the light-receiving unit 65 is supplied to the controller 62. The controller 62 performs image analysis using the video signal of the ambient light obtained when the organic EL panels 25a to 25d and 26a to 26d are not driven to thereby determine the color and brightness (luminosity) of the ambient light. For example, the respective average RGB values are computed using the RGB values of all the pixels in the video signal, and color and brightness are computed on the basis of the respective average RGB values and used as the color and brightness of the ambient light. The controller 62 serves as an acquisition unit and an adjustment unit, drives the organic EL panels 25a to 25d and 26a to 26d on the basis of the differences between the color and brightness of the ambient light and the color and brightness corresponding to a selected scene, and adjusts the emission color and brightness of each of the organic EL panels 25a to 25d and 26a to 26d.

Figure 7:
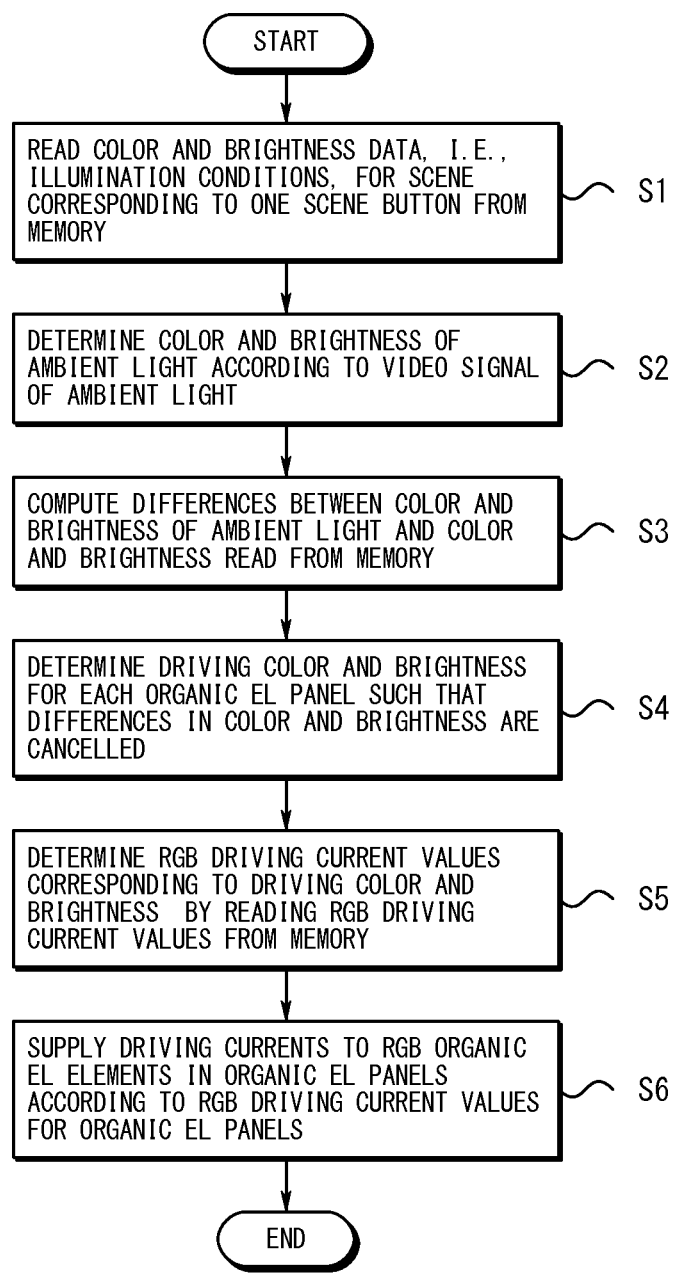
FIG. 7 is a flowchart showing a control operation of the driving unit in FIG. 5.

When the user presses one of the scene buttons 75a to 75e, the controller 62 reads, from the memory 63, the color and brightness, i.e., illumination condition data, for the scene corresponding to the operated scene button, as shown in FIG. 7 (step S1). Then the controller 62 determines the color and brightness of the ambient light as described above using the video signal of the ambient light supplied from the light-receiving unit 65 (step S2). Then the differences between the color and brightness of the ambient light and the color and brightness read from the memory 63 (the difference in color and the difference in brightness) are computed (step S3). The controller 62 determines the color and brightness for driving the scene corresponding to the scene button for each of the organic EL panels such that each of the differences in color and brightness is cancelled (step S4). Then the controller 62 determines RGB driving current values corresponding to the driving color and brightness for each of the organic EL panels by reading the RGB driving current values from the memory 63 (step S5). Then the controller 62 supplies driving currents to the respective RGB organic EL elements 50R, 50G, and 50B of red, green and blue emission in each of the organic EL panels 25a to 25d and 26a to 26d according to the read RGB driving current values for the organic EL panels (step S6). When these steps S1 to S6 are executed, the organic EL panels 25a to 25d and 26a to 26d are turned on, and the makeup subject whose image is reflected in the mirror surface of the mirror 21 is illuminated.

Therefore, the influence of the ambient light can be eliminated from the illumination for the scene corresponding to the selected scene button, and the illumination conditions optimal for the scene can be produced.

The pressing of one of the scene buttons 75a to 75e in the operation unit 64 corresponds to a selection step, and step S1 in the controller 62 corresponds to an acquisition step. Step S2 corresponds to a detection step, and steps S3 to S6 correspond to an adjustment step.

In the embodiment described above, the color and brightness of the ambient light are directly detected. However, the color and brightness of a subject image of the makeup subject reflected in the mirror surface of the mirror 21 under the ambient light may be detected.

When the color and brightness of the makeup subject are detected as described above, the light-receiving unit 65 captures the image of (the face or skin of) the makeup subject reflected in the mirror surface of the mirror 21 under the ambient light and outputs the video signal of the obtained image. The color and brightness (luminosity), i.e., illumination conditions, that the makeup subject receives corresponding to each of the plurality of scenes are pre-stored as data in the memory 63.

Figure 8:
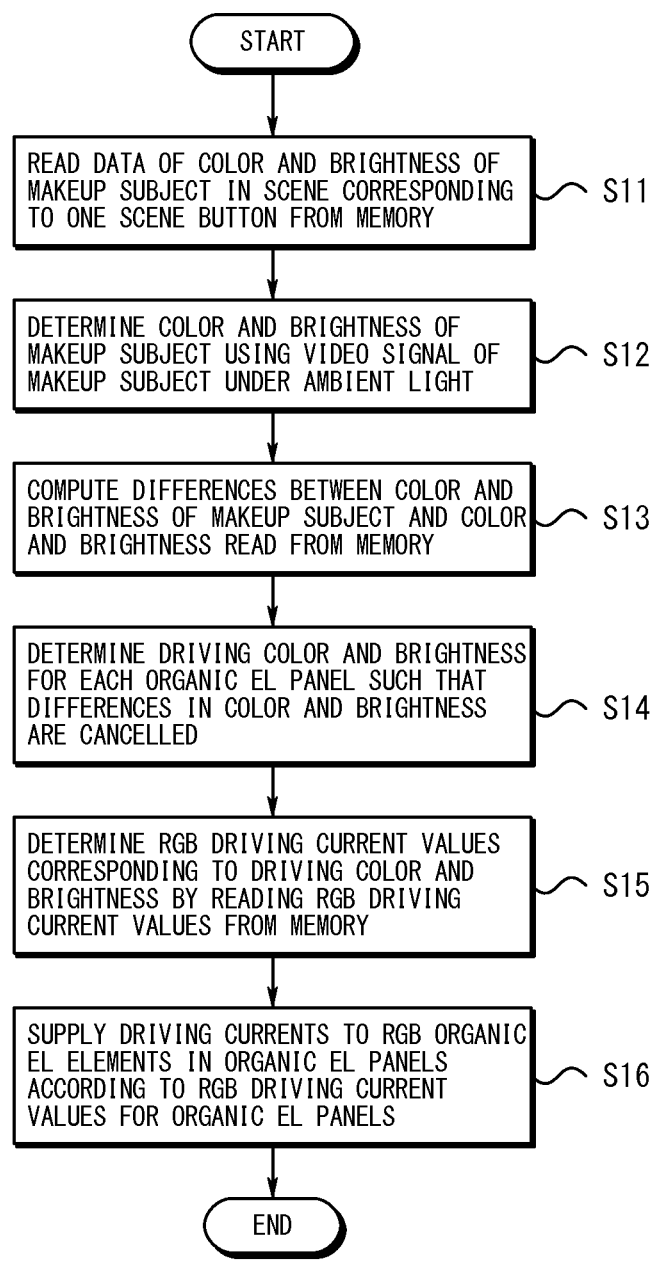
FIG. 8 is a flowchart showing a control operation of the driving unit in FIG. 5.

As shown in FIG. 8, the controller 62 reads, from the memory 63, the color and brightness that the makeup subject receives in the scene corresponding to the operated scene button when the organic EL panels 25a to 25d and 26a to 26d are turned on (step S11). The controller 62 determines the color and brightness of the makeup subject using the video signal of the makeup subject supplied from the light-receiving unit 65 (step S12) and then computes the differences between the color and brightness of the makeup subject and the color and brightness read from the memory 63 (the difference in color and the difference in brightness) (step S13). The controller 62 determines the color and brightness for driving the scene corresponding to the scene button for each of the organic EL panels such that the differences in color and brightness are cancelled (step S14). Then the controller 62 determines RGB driving current values corresponding to the driving color and brightness for each of the organic EL panels by reading the RGB driving current values from the memory 63 (step S15). Then the controller 62 supplies driving currents to the RGB emission organic EL elements 50R, 50G, and 50B in the organic EL panels 25a to 25d and 26a to 26d according to the read RGB driving current values for the organic EL panels (step S16). Steps S14 to S16 are the same as steps S4 to S6 in FIG. 6.

Therefore, also when the color and brightness of the makeup subject are detected, the influence of the ambient light can be eliminated from the illumination for the scene corresponding to the selected scene button, and the illumination conditions optimal for the scene can be produced for the makeup subject in consideration of the color of the skin, e.g., sunburned skin, of the makeup subject.

Figure 9:
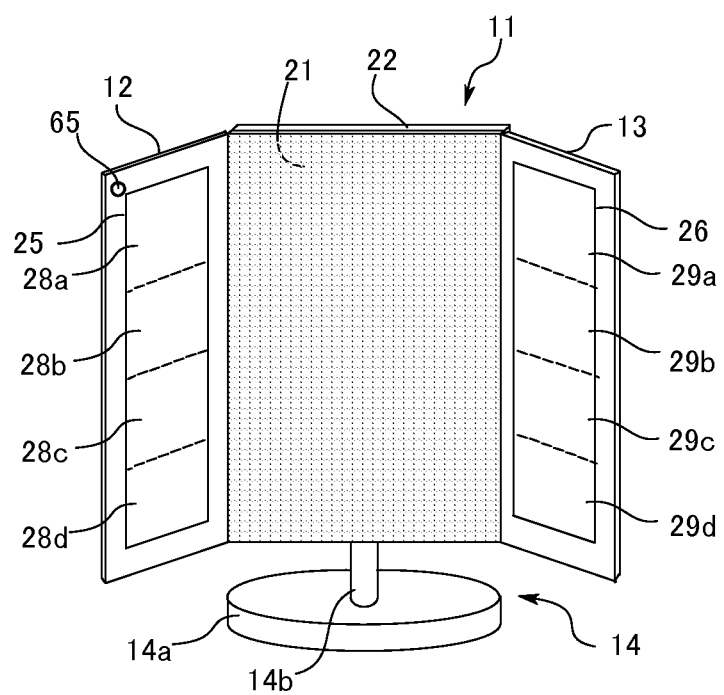
FIG. 9 is an external view of an illuminated makeup mirror set including single surface light sources each having a light-emitting surface divided into a plurality of regions driven independently.

FIG. 9 shows an illuminated makeup mirror set including single surface light sources each having a light-emitting surface divided into a plurality of regions driven independently. For example, in the embodiment shown in FIG. 1, the plurality of organic EL panels 25a to 25d and 26a to 26d are attached to the side plates 12 and 13. However, as shown in FIG. 9, single elongated organic EL panels 25 and 26 may be attached to the side plates 12 and 13. In the illuminated makeup mirror set in FIG. 9, the light-emitting surface of each of the organic EL panels 25 and 26 is divided into a plurality of regions, e.g., four regions 28a to 28d or 29a to 29d, as shown by dotted lines in FIG. 9. The controller drives each of these regions according to the input operation by the user from the operation unit in the same manner as in the driving of each panel in the above-described embodiment, and the emission color and brightness of each region are adjusted according to the scene.

Figure 10:
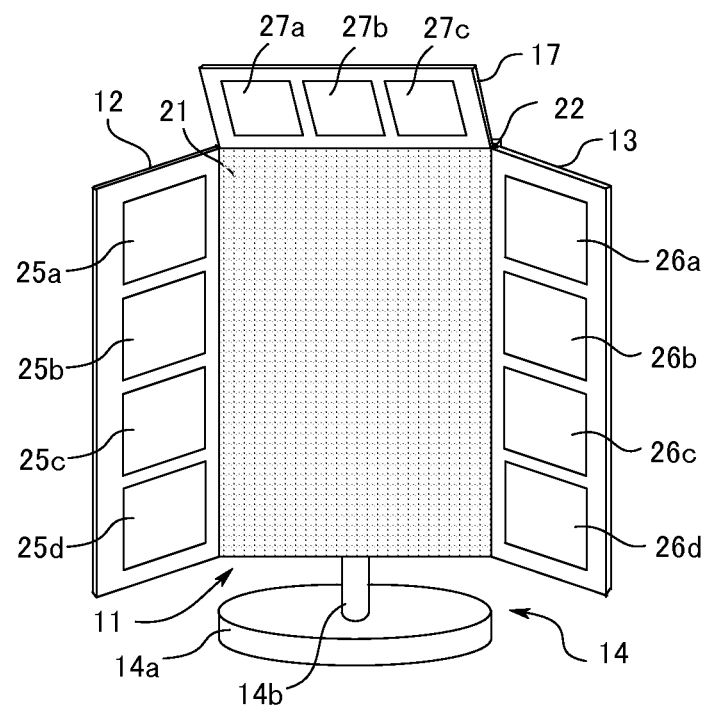
FIG. 10 is an external view of an illuminated makeup mirror set including surface light sources disposed on the left, right, and upper sides of the mirror.

In the above-described embodiment of the present invention, the surface light sources are disposed on the left and right sides of the mirror surface of the mirror unit. However, another surface light source may be disposed above the mirror surface. For example, as shown in FIG. 10, in the makeup mirror set further including the surface light source disposed above the mirror surface, the left and right side plates 12 and 13 are connected to the mirror unit 11 such that the angles therebetween are freely adjustable. An upper plate 17 is connected to the upper portion of the mirror unit 11 such that the angle therebetween is freely adjustable, and three organic EL panels (surface light sources) 27*a* to 27*c* are horizontally arranged and attached to the upper plate 17.

REFERENCE NUMERALS

11 Mirror unit
12, 13 Side plate
14 Support
15 Hinge mechanism
25*a* to 25*d*, 26*a* to 26*d*, 27*a* to 27*c* Organic EL panel
50R, 50G, 50B Organic EL element

The invention claimed is:

1. An illuminated makeup mirror set having a mirror unit, comprising:
a surface light source for illumination with adjustable color and brightness of an image of a person reflected in a mirror surface of the mirror unit under the ambient light when the surface light source is turned off;
a memory unit in which illumination conditions corresponding to a plurality of scenes are stored, the illumination conditions including color and brightness of the person in each of the plurality of scenes;
a detection unit for detecting color and brightness of ambient light at an installation position of the makeup mirror set;
a selection unit for selecting one of the plurality of scenes according to an input operation;
an acquisition unit for acquiring, from the memory unit, the illumination conditions corresponding to the scene selected through the selection unit; and
an adjustment unit for adjusting the color and brightness of the surface light source according to the color and brightness of the person detected by the detection unit and the illumination conditions acquired by the acquisition unit.

2. The illuminated makeup mirror set according to claim 1, wherein
the surface light source comprises a plurality of surface light sources,
the memory unit stores illumination conditions for each of the plurality of scenes for each of the plurality of surface light sources, and
the adjustment unit adjusts the color and brightness of each of the plurality of surface light sources according to the color and brightness of the person detected by the detection unit and the illumination conditions acquired by the acquisition unit for each of the plurality of surface light sources.

3. The illuminated makeup mirror set according to claim 1, wherein
the illumination conditions include the color and brightness of each of the scenes, and
the adjustment unit adjusts the color and brightness of the surface light source according to the differences between the color and brightness of the person detected by the detection unit and the color and brightness of the illumination conditions acquired by the acquisition unit.

4. The illuminated makeup mirror set according to claim 3, wherein
the adjustment unit adjusts the color and brightness of the surface light source such that differences between the color and brightness of the person detected by the detection unit and the color and brightness of the illumination conditions acquired by the acquisition unit are cancelled.

5. A method of controlling a light source in an illuminated makeup mirror set including a mirror unit and a surface light source for illumination with adjustable color and adjustable brightness, the method comprising:
a detection step of detecting color and brightness of an image of a person reflected in a mirror surface of the mirror unit under ambient light when the surface light source is turned off;
a selection step of selecting one scene from the plurality of scenes according to an input operation;
an acquisition step of acquiring, from a memory unit in which illumination conditions corresponding to a plurality of scenes are stored, the illumination conditions corresponding the scene selected through the selection step, the illumination conditions including color and brightness of the person in each of the plurality of scenes; and
an adjustment step of adjusting the color and brightness of the surface light source according to the color and brightness of the person detected in the detection step and the illumination conditions acquired in the acquisition step.

6. An illumination set having a mirror, comprising:
a surface light source configured to provide adjustable brightness;
a detection unit configured to detect brightness of ambient light;
a selection unit configured to select one of a plurality of scenes according to an input operation;
an acquisition unit configured to acquire an illumination condition, including brightness under ambient light of a subject image that is reflected in the mirror, corresponding to a selected scene; and
an adjustment unit configured to adjust the brightness of the surface light source according to a detected brightness of the subject image that is reflected in the mirror and the acquired illumination condition.

7. The illumination set according to claim 6, wherein the surface light source comprises a plurality of surface light sources, and
the adjustment unit is configured to adjust the brightness of each of the plurality of surface light sources according to the detected brightness of the subject image that is reflected in the mirror and the acquired illumination condition for each of the plurality of surface light sources.

8. The illumination set according to claim 6, further comprising a memory unit configured to store illumination conditions corresponding to the plurality of scenes,
wherein the acquisition unit acquires the illumination condition from the memory unit.

9. The illumination set according to claim 6, wherein the illumination condition includes the brightness of each of the plurality of scenes, and
the adjustment unit is configured to adjust the brightness of the surface light source according to the difference between the detected brightness of the subject image that is reflected in the mirror and the brightness of the acquired illumination condition.

10. The illuminated set according to claim 9, wherein the adjustment unit is configured to adjust the brightness of the surface light source such that the detected brightness of the subject image that is reflected in the mirror is made substantially equal to the brightness of the acquired illumination condition.

11. The illumination set according to claim 7, wherein the illumination condition includes the brightness of each of the plurality of scenes for each of the plurality of surface light sources, and
    the adjustment unit is configured to adjust the brightness of each of the plurality of surface light sources according to a difference between the detected brightness of the subject image that is reflected in the mirror and the brightness of the acquired illumination condition for each of the plurality of surface light sources.

12. The illumination set according to claim 7, further comprising a memory unit configured to store illumination conditions for each of the plurality of scenes for each of the plurality of surface light sources,
    wherein the acquisition unit acquires the illumination condition for each of the plurality of surface light sources from the memory unit.

13. The illuminated set according to claim 11, wherein the adjustment unit is configured to adjust the brightness of each of the plurality of surface light sources such that the detected brightness of the subject image that is reflected in the mirror is made substantially equal to the brightness of the acquired illumination condition for each of the plurality of surface light sources.

* * * * *